(12) United States Patent
De Filippis

(10) Patent No.: US 8,476,855 B2
(45) Date of Patent: Jul. 2, 2013

(54) ELECTRIC DRIVE AND METHOD FOR CONTROLLING IT

(75) Inventor: Pietro De Filippis, Varazze (IT)

(73) Assignee: SPAL Automotive S.r.l. (IT)

( * ) Notice: Subject to any disclaimer, the term of this patent is extended or adjusted under 35 U.S.C. 154(b) by 532 days.

(21) Appl. No.: 12/677,716

(22) PCT Filed: Sep. 9, 2008

(86) PCT No.: PCT/IB2008/002372
§ 371 (c)(1),
(2), (4) Date: Apr. 1, 2010

(87) PCT Pub. No.: WO2009/034455
PCT Pub. Date: Mar. 19, 2009

(65) Prior Publication Data
US 2010/0201298 A1 Aug. 12, 2010

(30) Foreign Application Priority Data
Sep. 12, 2007 (IT) ............... BO2007A0619

(51) Int. Cl.
*H02P 6/00* (2006.01)
(52) U.S. Cl.
USPC ............ 318/400.35; 318/400.01; 318/400.32; 318/400.34; 318/700
(58) Field of Classification Search
USPC ............ 318/400.34, 400.35, 400.01, 400.32, 318/700
See application file for complete search history.

(56) References Cited

U.S. PATENT DOCUMENTS

| 4,528,486 | A | 7/1985 | Flaig | |
|---|---|---|---|---|
| 5,539,354 | A | 7/1996 | Carsten | |
| 7,157,878 | B2 * | 1/2007 | Collier-Hallman | 318/567 |
| 2004/0145330 | A1 | 7/2004 | Maslov | |
| 2006/0261767 | A1 | 11/2006 | Nakagawa | |
| 2007/0069677 | A1 * | 3/2007 | MacKay | 318/439 |
| 2007/0108937 | A1 * | 5/2007 | Mir | 318/807 |
| 2007/0164691 | A1 * | 7/2007 | MacKay | 318/1 |
| 2007/0236168 | A1 * | 10/2007 | Suzuki | 318/812 |
| 2007/0285047 | A1 * | 12/2007 | Palma et al. | 318/801 |
| 2008/0265808 | A1 * | 10/2008 | Sparey et al. | 318/139 |

FOREIGN PATENT DOCUMENTS

| EP | 0472052 | | 2/1992 |
|---|---|---|---|
| JP | 2001095297 | * | 4/2001 |
| JP | 2006115678 | | 4/2006 |
| WO | WO 2006005927 A2 | * | 1/2006 |

OTHER PUBLICATIONS

PCT International Search Report and Written Opinion dated Jan. 14, 2009.

* cited by examiner

*Primary Examiner* — Kawing Chan
(74) *Attorney, Agent, or Firm* — Timothy J. Klima; Shuttleworth & Ingersoll, PLC

(57) ABSTRACT

An electric drive (1) comprises: a permanent magnet brushless motor (2), a motor (2) power supply bridge (3), a circuit for controlling the power supply bridge (3) according to rotor position and phase currents ($I_S$); the drive (1) comprises a circuit (6) for detecting the zero crossings of the induced counter electromotive force ($E_S$) in the stator windings to determine the position of the rotor and a circuit (25) for indirectly detecting the amplitudes of the phase currents ($I_S$).

14 Claims, 6 Drawing Sheets

ELECTRIC DRIVE AND METHOD FOR CONTROLLING IT

CROSS-REFERENCE TO RELATED APPLICATIONS

This application is the National Phase of International Application PCT/IB2008/002372 filed Sep. 9, 2008 which designated the U.S. and that International Application was published under PCT Article 21(2) in English.

This application claims priority to Italian Patent Application No. BO2007A000619 filed Sep. 12, 2007, and PCT Application No. PCT/IB2008/002382 filed Sep. 9, 2008, which applications are incorporated by reference herein.

TECHNICAL FIELD

This invention relates to an electric drive for a brushless motor with permanent magnets and to a method for controlling the drive.

By way of non-limiting example, this specification describes a drive comprising a three-phase brushless motor with permanent magnets that generates a sine-wave counter electromotive force (c.e.m.f.) for driving axial, radial and other types of fans used in electric ventilators.

BACKGROUND ART

Considering that the field of application of these electric fans is that of climate control and cooling systems for installation in motor vehicles, it should be observed that the main aims of developing electric fans for this purpose are: low acoustic noise, limited energy consumption and reduced costs.

These requirements have led to the adoption of sine-wave c.e.m.f. brushless motors (AC brushless motors) driven by inverter capable of generating sine-wave currents and making obsolete the use of PWM six-step driven trapezoidal c.e.m.f. motors (more commonly known as DC brushless motors).

The sine waveform of the c.e.m.f. and of the related phase current minimizes active torque ripple (virtually zero), thus reducing mechanical vibrations and acoustic noise.

It is also known that it is possible to minimize current draw to generate a certain drive torque, thereby maximizing electromechanical conversion efficiency through optimum drive of AC brushless motors which are normally driven by current-controlled, impressed voltage inverters.

To obtain this type of drive, the static switches must change state in such a way that the polar axis of the rotor magnetic field remains at 90 electrical degrees to the polar axis of the magnetic field generated by the current circulating in the stator windings, whatever the torque supplied and the rotation speed.

To obtain information about the angular position of the rotor, relatively expensive devices are normally used, including absolute encoders or Hall effect sensors, integral with the stator and suitably positioned angularly, to detect the sine waveform of the magnetic energizing field along the periphery of the rotor.

The output signals generated by the sensors are then suitably decoded to drive the static switches in such a way as to keep the angular shift of 90 electrical degrees between the rotor and stator magnetic fields.

This type of drive requires the use of the above mentioned position sensors, whose cost is relatively high.

In an attempt to reduce the cost of drives, driving strategies that do not use sensors of this type have been developed.

These driving strategies are based on the consideration that if drive is optimum, the c.e.m.f. and the phase current are in phase and vice versa at each point in the operating field (torque, rotation speed, DC supply voltage).

Consequently, these driving strategies and drives, which have come to be known as "sensorless", are based on the reading of electrical quantities (e.g. voltage at motor terminals or current circulating in motor windings) to detect the points where the c.e.m.f. and the current cross zero (zero crossings), calculate the relative phase between c.e.m.f. and current and implement appropriate methods of driving the inverter static switches which tend to keep the two quantities in phase.

One disadvantage of these methods lies in the fact that to detect the zero crossing of the c.e.m.f., that is to say, to read the sign of the c.e.m.f., the current flowing through the windings must remain zero long enough to enable the reading to be taken, which contrasts with the desired sinusoidal waveform of the current.

For the deviation from the ideal to have negligible effects, the length of the time interval during which the current remains zero must be reduced to the minimum and, to eliminate the distortion induced by the controlled phase current interruption, however brief, and the risks of not reading the desired signal, sophisticated algorithms are introduced to calculate the angular position of the rotor in real time: in practice, these algorithms are an integral part of field-oriented controls (FOC in the jargon of the trade) and require the use of sophisticated and expensive controllers with high processing capacity (known as DSP controllers in the jargon of the trade).

DISCLOSURE OF THE INVENTION

In this context, the main purpose of the present invention is to propose an electric drive which is free of the above mentioned disadvantages.

One aim of this invention is to provide a low-noise and low energy consumption drive.

Another aim of the invention is to provide an electric drive based on a simple and inexpensive control architecture.

The stated technical purpose and specified aims are substantially achieved by an electric drive with the characteristics described in claim 1 and in one or more of the dependent claims. The invention also relates to a method of controlling the drive.

BRIEF DESCRIPTION OF THE DRAWINGS

Further characteristics and advantages of the invention are more apparent in the description below, with reference to a preferred, non-limiting embodiment of an electric drive for permanent magnet brushless motors, as illustrated in the accompanying drawings, in which.

DETAILED DESCRIPTION OF THE PREFERRED EMBODIMENTS OF THE INVENTION

Figure 1:
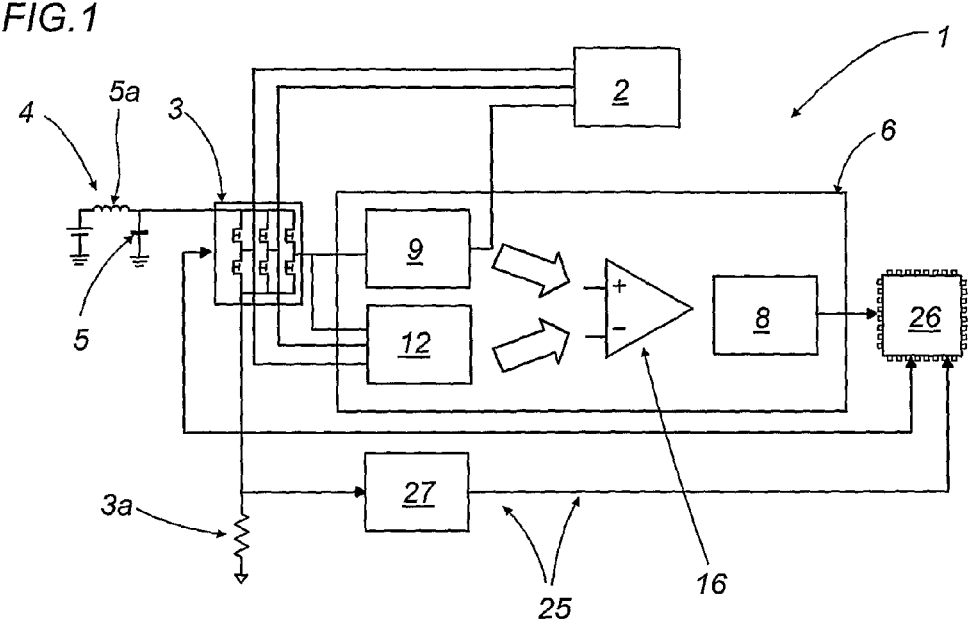
FIG. 1 shows a principle diagram of the electric brushless motor drive according to the invention.

With reference to the accompanying drawings and in particular with reference to FIG. 1, the numeral 1 denotes an electric drive according to this invention.

This invention is based on the principle of obtaining information, continuous in time, from which to derive the supply voltage values for optimizing control of the motor powered by the electric drive.

The drive 1 comprises an electric motor 2, for example for driving a fan not illustrated.

As becomes clearer as this description continues, the purpose of the drive 1 is to obtain information relating to the position of the motor 2 rotor by detecting the zero crossing of the counter electromotive force (also referred to in the abbreviated form c.e.m.f.) in a simple and economical manner.

By way of example, without limiting the scope of the invention, this specification refers to a permanent magnet brushless motor 2 with isotropic, two-pole rotor and three-phase stator winding.

The stator winding comprises three windings with identical shape and number of turns, spatially phase-shifted by 120° and connected by a wye connection whose centre is not accessible.

Figure 2:
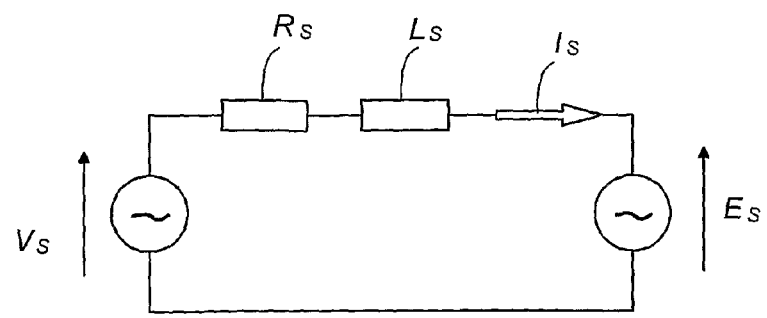
FIG. 2 illustrates an equivalent circuit of a phase of an AC brushless motor.

FIG. 2 illustrates a circuit model of the motor 2.

Each of the three windings is characterized by a phase resistance $R_S$ and a synchronous inductance $L_S$.

A voltage $V_S$ is applied to the motor 2, while a vector $E_S$ represents the induced c.e.m.f. in each of the three stator windings.

The c.e.m.f. has a sine waveform and is due to the rotation of the permanent magnet rotor; $I_S$ is the phase current, also sinusoidal, which flows through each of the three windings.

Figure 3:
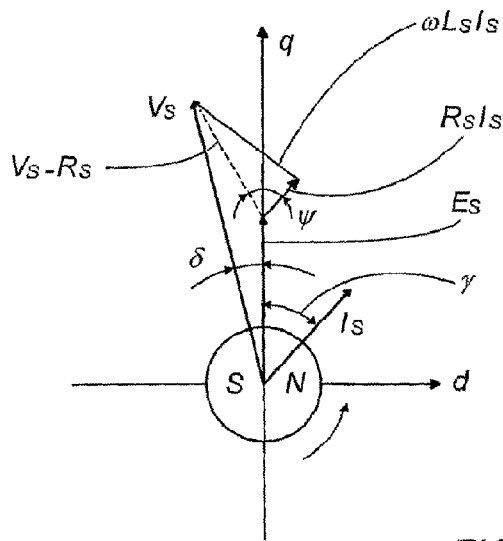
FIG. 3 illustrates a vector diagram of the circuit of FIG. 2.

FIG. 3 shows the vector diagram of the electrical quantities $V_S$, $I_S$, $E_S$ just mentioned.

The direct axis d is oriented in the rotor flow direction $\phi_r$ and the quadrature axis q makes an angle of 90° with the direct axis d.

According to the law of induction (e=d$\phi$/dt) the induced c.e.m.f. $E_S$ in the stator winding is always directed along the quadrature axis q, i.e. it is phase-shifted by 90° with respect to the rotor flow $\phi_r$.

The voltage $V_S$ applied by the drive 1 to the stator windings for a predetermined operating condition is, as mentioned, represented by the vector $V_S$.

The stator current vector $I_S$ makes an angle $\Psi$ with the vector difference $V_S$–$E_S$. The angle $\Psi$ depends on the characteristic parameters of the motor and on the supply frequency according to the relation:

$$\Psi = \arctan(\omega L_S/R_S).$$

The electromagnetic power yield of the motor is given by $3E_S I_S \cos(\gamma)$ where $\gamma$ is the angle made by $E_S$ and $I_S$.

The power absorbed by the motor 2 is essentially the sum of the electromagnetic power yield and of the power losses due to the Joule effect in the three phase resistors.

Figure 4:
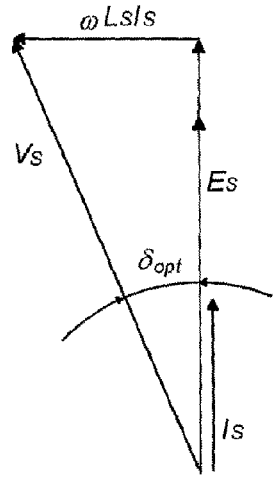
FIG. 4 illustrates a vector diagram representing optimum operation of the circuit of FIG. 2.

Hence, given a certain electromagnetic yield, the absorbed power is lowest when the angle $\gamma$ is zero, that is, when the c.e.m.f. $E_S$ and the current $I_S$ are in phase, as illustrated in FIG. 4.

As illustrated in FIG. 1, the drive 1 comprises a three-phase bridge 3 or inverter for powering the motor 2.

Preferably, the drive 1 comprises a low-inductance shunt 3a connected as shown in FIG. 1 to the three legs of the inverter 3 and crossed by the currents circulating in the inverter, as described in more detail below.

The drive 1 also comprises a direct current stage 4 for powering the bridge 3 and in turn comprising a levelling capacitor 5 (Cbus) and a filtering inductor 5a (Lbus).

By way of example, the three-phase bridge 3 generates, through sine-delta PWM modulation of substantially known type, three voltages phase-shifted by 120° from each other at variable frequency "freq".

Advantageously, the amplitude of the fundamental supply voltages can be programmed both as a linear function of the frequency f and independently of the latter.

It should be noticed that, as is well known, the permanent magnet brushless motor 2 develops torque only at its synchronous speed and therefore it will rotate exactly at a speed directly proportional to the frequency f of the applied voltages according to the known relation RPM=120×freq/p, where p is the number of poles of the permanent magnet rotor.

The drive 1 comprises a circuit 6 for detecting the counter electromotive force and, more specifically, the zero crossings of the c.e.m.f. $E_S$, hereinafter also referred to as c.e.m.f. zero crossing detection circuit 6.

Figure 5:
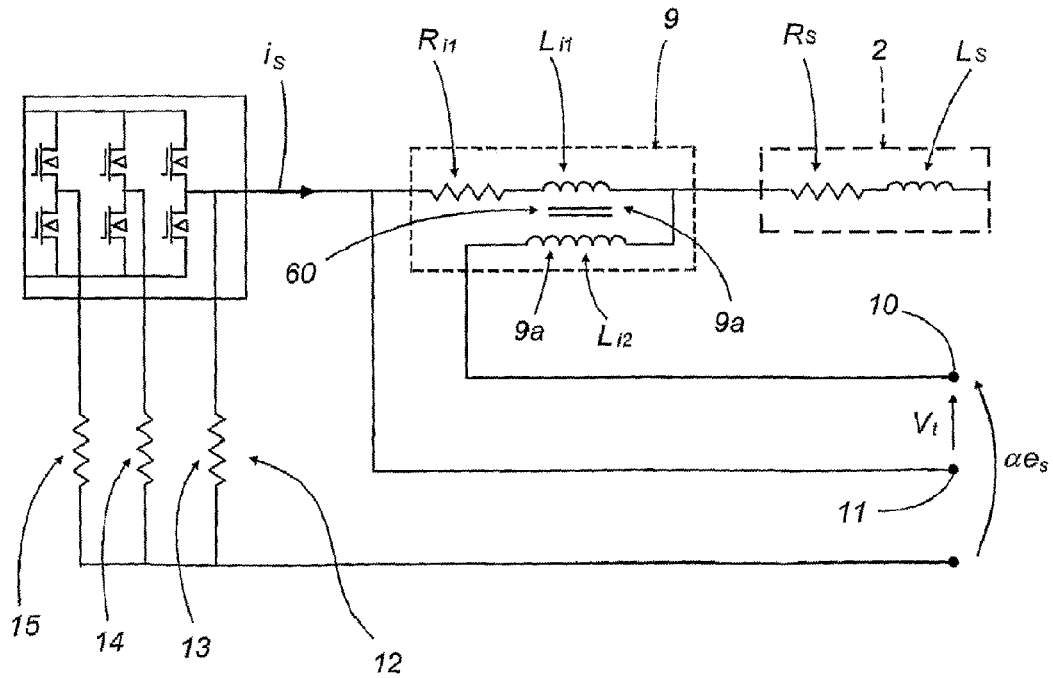
FIG. 5 is a diagram showing an example of a portion of the drive according to the invention.
Figure 6:
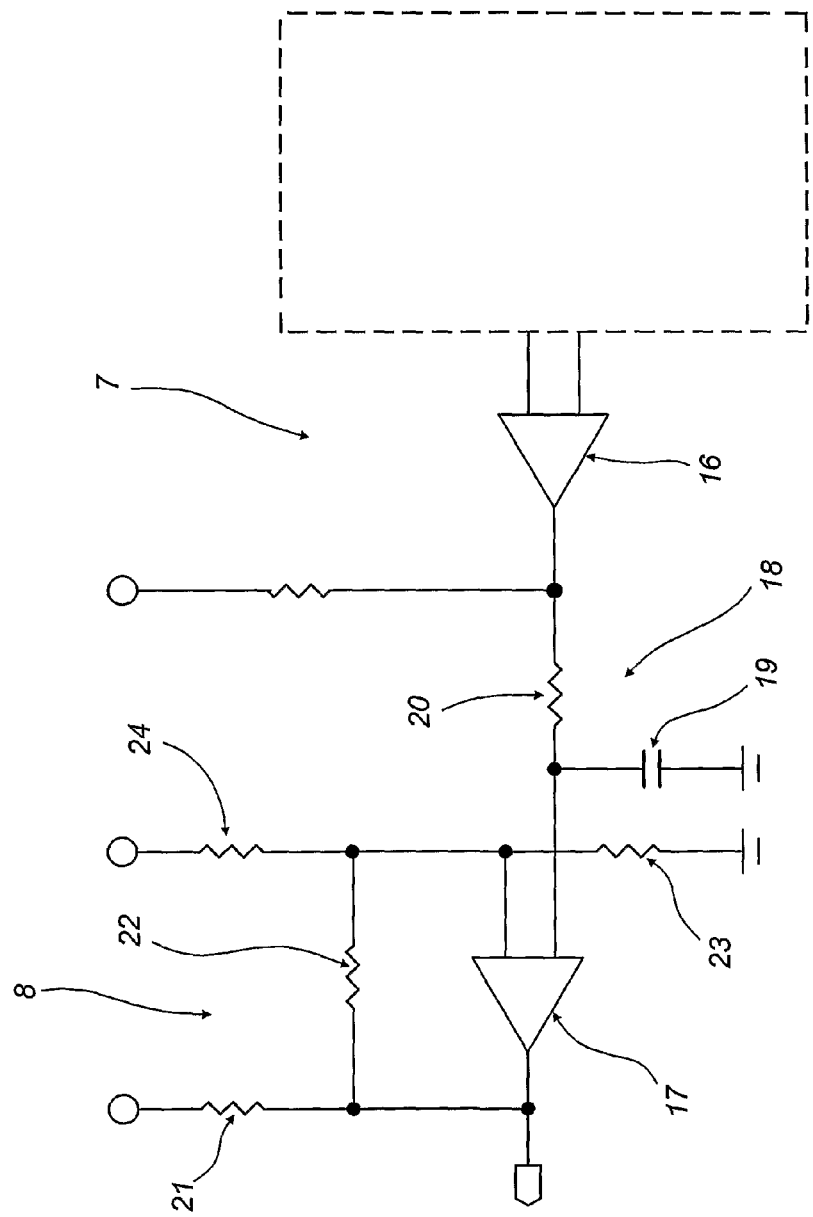
FIG. 6 shows a circuit diagram of a first detail of the drive of FIG. 1.

The detection circuit 6 comprises a first stage, illustrated in FIG. 5, and a second stage, illustrated in FIG. 6. The second stage processes the output signal from the first stage.

In the preferred embodiment illustrated, as will become clearer as this description continues, the information on the position of the rotor is obtained by detecting the zero crossings of the c.e.m.f. generated by only one of the three phases of the motor.

In alternative embodiments, for example in more sophisticated applications that require higher transient response speeds, a rotor position signal is detected for all the phases by replicating the circuit described above for each phase.

Considering, for convenience of description, the phase quantities of a wye connected motor 2 (it is also known that a delta connected motor is functionally indistinguishable from its wye connected equivalent), the value of the c.e.m.f. is given by the relation:

$$e_s = v_s - \left(R_s i_s + L_s \frac{d i_s}{d t}\right)$$

To find the value of e, it is therefore necessary to know both the value $v_S$ of the voltage $V_S$ applied to the phase of the motor 2 and the resistive-inductive drop due to the flow of current in the windings of the motor 2.

As described below, the drive 1 according to the invention has for an aim to find the resistive-inductive drop and the voltage applied to the phase of the motor 2.

For finding the resistive-inductive drop, the drive 1 comprises, as illustrated in FIG. 5, an inductive-resistive element 9 connected in series with one of the three phases of the motor 2, as described below.

The element 9 comprises a first inductor $L_{i1}$ and a second inductor $L_{i2}$ with a mutual magnetic coupling coefficient very close to 1.

The two inductors $L_{i1}$ and $L_{i2}$ are connected to form an autotransformer 9a and, preferably, are wound around a magnetic core illustrated schematically and labelled 30 in FIG. 5.

By way of example, the magnetic core is in the shape of a double E and is made either of high-frequency ferrite or of plain steel for magnetic plates.

The first inductor $L_{i1}$ is connected in series with one of the phase windings of the motor 2 and constitutes the primary of the autotransformer 9a.

Preferably, the inductor $L_{i1}$ has a low number N1 of large diameter turns to minimize the power loss due to the Joule effect.

$R_{i1}$ represents the resistance of the winding of the first inductor $L_{i1}$.

The second inductor $L_{i2}$, which constitutes the secondary of the autotransformer, has a number N2 of turns much higher than the number N1 of turns of the inductor $L_{i1}$ and is not crossed by the current $i_S$, and therefore provides a voltage $V_{t2}$ that depends on the derivative of the current $i_S$ flowing on the primary.

With reference to FIG. 5, if:

$V_t$=voltage at the terminal 10, 11 of FIG. 5, that is, at the terminals of the inductive-resistive element 9;
$V_R$=voltage drop on the resistor $R_{i1}$
$V_{t1}$=voltage drop on the first inductor $L_{i1}$;
$V_{t2}$=voltage drop on the second inductor $L_{i2}$;
M=mutual inductance between $L_{i1}$ and $L_{i2}$;
then:

$$V_t = V_R + V_{t1} + V_{t2}$$

$$V_t = R_{i1} i_s + L_{i1} \frac{d i_s}{dt} + M \frac{d i_s}{dt}$$

$$V_t = R_{i1} i_s + (L_{i1} + M) \frac{d i_s}{dt}$$

It is important to note that the expression for $V_t$ is formally identical to that for the resistive-inductive drop in the windings of the motor 2 due to the flow of current.

The following equation can therefore be written:

$$R_{i1} i_s + (L_{i1} + M) \frac{d i_s}{dt} = \alpha \left( R_s i_s + L_s \frac{d i_s}{dt} \right)$$

where $$\alpha = \frac{R_{i1}}{R_s}$$

is an attenuation coefficient and $0<\alpha<1$.

Since the synchronous inductance $L_S$ of the motor 2, the self-inductance of the primary $L_{i1}$ and the related number of turns N1 can be used to find the number of turns N2 of the secondary $L_{i2}$ which satisfies the equation:

$$N2 = N1 \left( \frac{\alpha L_S}{L_{i1}} - 1 \right)$$

Thus, by making a resistive-inductive element 9 with the parameters specified above, the attenuated value of the resistive-inductive drop on the phase of the motor 2 can be obtained using, in practice, a measuring circuit corresponding to the equivalent circuit of the phase of the motor 2.

It should be noticed that the attenuation coefficient $\alpha$ indicates the impact of the c.e.m.f. detection circuit 6 on the total loss of the drive 1: the lower the coefficient, the lower the loss.

The information on the voltage $V_S$ applied to the motor 2 is obtained using a circuit 12 for measuring the applied voltage.

The measuring circuit 12 comprises three wye connected resistors 13, 14, 15 illustrated in particular in FIG. 5.

By attenuating by the coefficient $\alpha$ both the contribution of the applied equivalent voltage $v_S$ measurable, as described in more detail below, by the set of wye connected resistors 13, 14, 15, and the contribution of the resistive-inductive drop supplied by the mutually coupled inductors $L_{i1}$ and $L_{i2}$, the circuit of FIG. 5 supplies an attenuated c.e.m.f. signal whose amplitude is given by:

$$\alpha \cdot e_S = \alpha \cdot v_S - \alpha \cdot R_S \cdot i_S - \alpha \cdot L_S \cdot \frac{d i_S}{dt}$$

Based on the attenuation coefficient $\alpha$ defined above, the wye connected resistors 13, 14, 15 used for measuring the supply voltage $V_S$ is suitably unbalanced.

Figure 9:
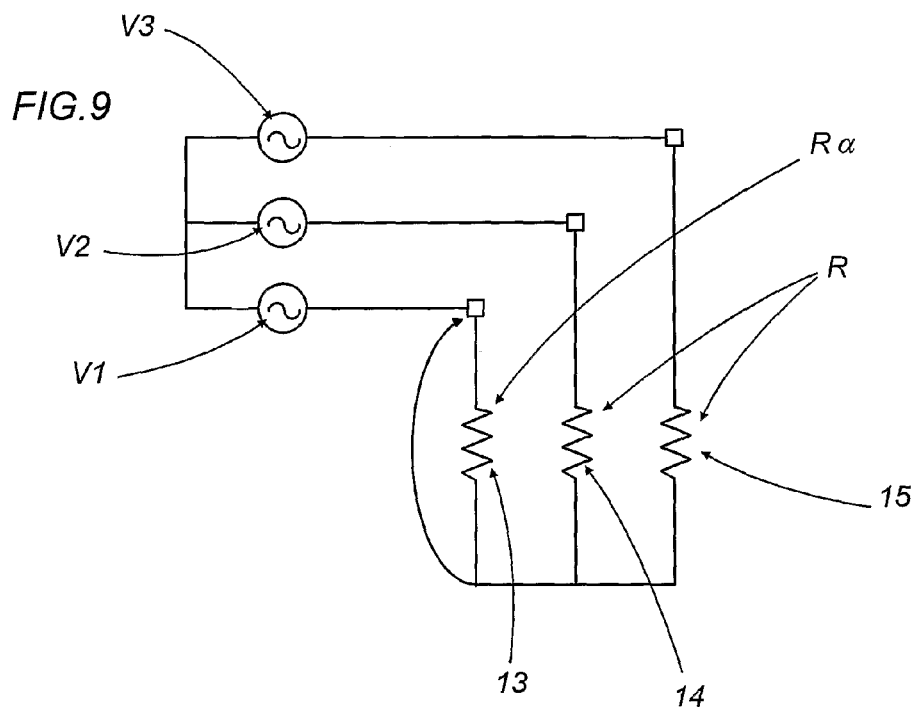
FIG. 9 is a diagram showing the voltages applied to the brushless motor.

FIG. 9 shows the real first harmonic voltages V1, V2, V3 generated by the inverter 3 and applied to the motor 2, each schematically represented with a respective ideal voltage generator.

As illustrated, the voltage $\alpha$V1 must appear at the terminals of the resistor 13, also labelled R$\alpha$.

Preferably, the values of the resistors 13, 14, 15 can be calculated, at a given point in time, with reference to the symmetrical three-phase triad that powers the motor 2.

For example, at the point in time where V1 reaches its maximum value Vm the values of V2 and V3 are −Vm/2.

Figure 10:
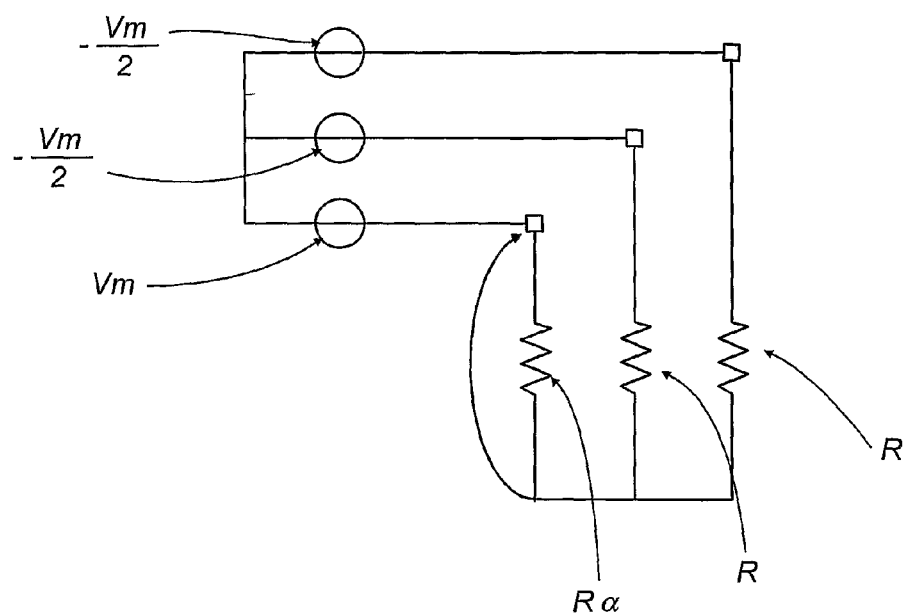
FIG. 10 shows the diagram of FIG. 9 in a particular operating condition.

The circuit to be analysed is therefore the one shown in FIG. 10.

Applying the overlapping effects principle to calculating the voltage drop on R$\alpha$ in the circuit of FIG. 10 gives:

$$V_\alpha = V_m \frac{R_\alpha}{\frac{R}{2} + R_\alpha} + V_m \frac{R_\alpha \parallel R}{R_\alpha \parallel R + R}$$

from which the relation between R$\alpha$ and R can be derived for the previously fixed value of $\alpha$:

$$R_\alpha = R \frac{\alpha}{3 - 2\alpha}$$

where R is a generic resistance value for the resistors 14 and 15.

Applying the signal $\alpha e_S$ to the signal conditioning circuit shown in FIG. 6 gives a signal for the zero crossing of the counter electromotive force that can be processed by a microcontroller 26.

It should be noticed that the behaviour obtained is substantially the same as that obtained with a digital output Hall sensor.

As illustrated in particular in FIG. 6, this circuit comprises two comparator stages connected in cascade: the first stage 7, with a respective comparator 16, does not exhibit any hysteresis and spurious switching can be detected at its output.

At low rotation speeds, the circuit of FIG. 5 for detecting the zero crossing of the c.e.m.f. gives voltage values of a few hundred millivolts and, owing to the low attenuation factor α, the signal-noise ratio is low and causes the above mentioned spurious switching at the output of the first stage 7 of the circuit of FIG. 6.

The second stage 8 comprises a second, hysteresis comparator 17 having an RC input filter 18 to limit the signal oscillations that might erroneously trigger the comparator 17.

The RC filter 18 comprises a capacitor 19 and a resistor 20 and is of substantially known type.

The second stage 8 also comprises a resistive network to fix the switching threshold and the related hysteresis.

In the embodiment illustrated, the resistive network comprises four resistors 21, 22, 23, 24 suitably connected to each other.

Thus, there is no spurious switching at the output of the hysteresis comparator stage, with obvious advantages in terms of the processing efficiency of the microcontroller 26.

To maximize the efficiency of the motor 2 the current flow in the stator windings must be in phase with the related c.e.m.f.

With reference to the vector diagram of FIG. 4, it is possible to obtain an approximated expression of the optimum advance angle $\delta_{opt}$ for the applied voltage $V_S$ with respect to the c.e.m.f. $E_S$.

If the resistive drop in the phase is negligible (the higher the efficiency of the motor 2, the more negligible the drop), assuming $K_E$ as the c.e.m.f. constant measured in V/rpm and p as the number of poles, then:

$$tg\delta_{opt} \cong \frac{\omega_{el} \cdot Ls \cdot Is}{Es} = \omega_{el} \cdot Ls \cdot Is \cdot \frac{\pi \cdot p}{60 \cdot K_E \cdot \omega_{el}} = \frac{\pi \cdot Ls \cdot p}{60 \cdot K_E} \cdot I_S$$

Moreover, if the optimum value of the angle $\delta_{opt}$ is less than 20 electrical degrees, the tangent of the angle can be approximated with the angle itself and hence:

$$\delta_{opt} \cong \frac{\pi \cdot Ls \cdot p}{60 \cdot K_E} \cdot I_S$$

where the synchronous inductance $L_S$ is preferably expressed in Henrys.

Figure 11:
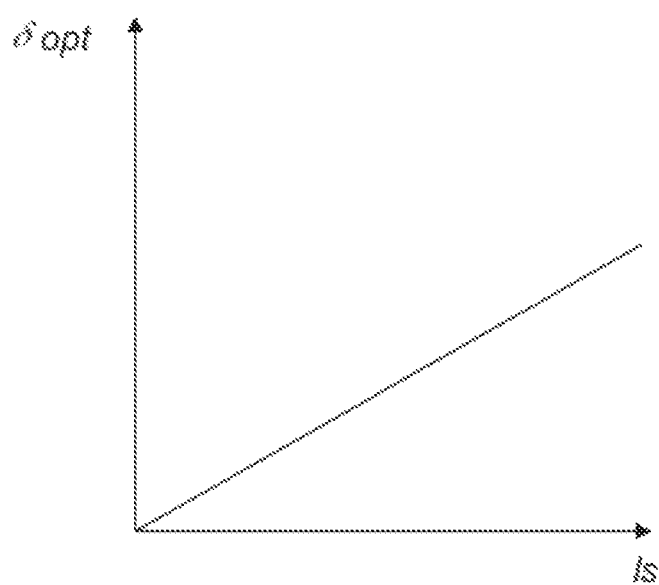
FIG. 11 shows a curve of the advance angle as a function of phase current.

In other terms, if the resistive drop $R_S I_S$ is negligible with respect to $E_S$ and the tangent of the advance angle $\delta_{opt}$ can be approximated with the angle itself, then, in practice, the advance angle $\delta_{opt}$ depends linearly only on the phase current $I_S$. See FIG. 11.

Since the drive 1 according to the invention comprises an extremely simple and economical microcontroller 26, for example an 8-bit microcontroller, the above mentioned linear relation between $\delta_{opt}$ and the current draw $I_S$; can be stored in it, for example in table format, making available to the microcontroller 26 a signal proportional to the current $I_S$ and the microcontroller 26 will be able to control the bridge 3 according to the corresponding $\delta_{opt}$.

It is for this purpose that the drive 1 comprises a circuit 25 for indirectly detecting phase current amplitudes.

More specifically, the circuit 25 comprises an enveloping detector or detector stage 27 which processes the voltage signal present at the terminals of the shunt 3a, directly proportional to the current flow through the shunt 3a itself.

As is known from the literature, the maximum value of the voltage peaks on the shunt 3a is proportional to the phase current peak of the motor 2.

Since the phase current is sinusoidal, the reading of the enveloping detector 27 is equal to the effective value Is of the phase current multiplied by $\sqrt{2}$.

The enveloping detector 27 keeps track of this information and the microcontroller 26 samples it at a much lower frequency than that of the carrier PWM: the validity of the information is guaranteed by the fact that the changing speed of the enveloping detector 27 output, which is directly linked to the changing speed of the mechanical load, is very low.

It should be noticed that the discharge constant of the detector 27 is suitably dimensioned to correctly follow the envelope of the current peaks on the shunt 3a.

Basically, the microcontroller 26, by sampling the output signal of the enveloping detector stage 27 through its analog-to-digital converter, indirectly measures the current value of the phase current and, as a result, determines the corresponding optimal angle to be applied to keep the current in phase with the c.e.m.f.

Figure 7:
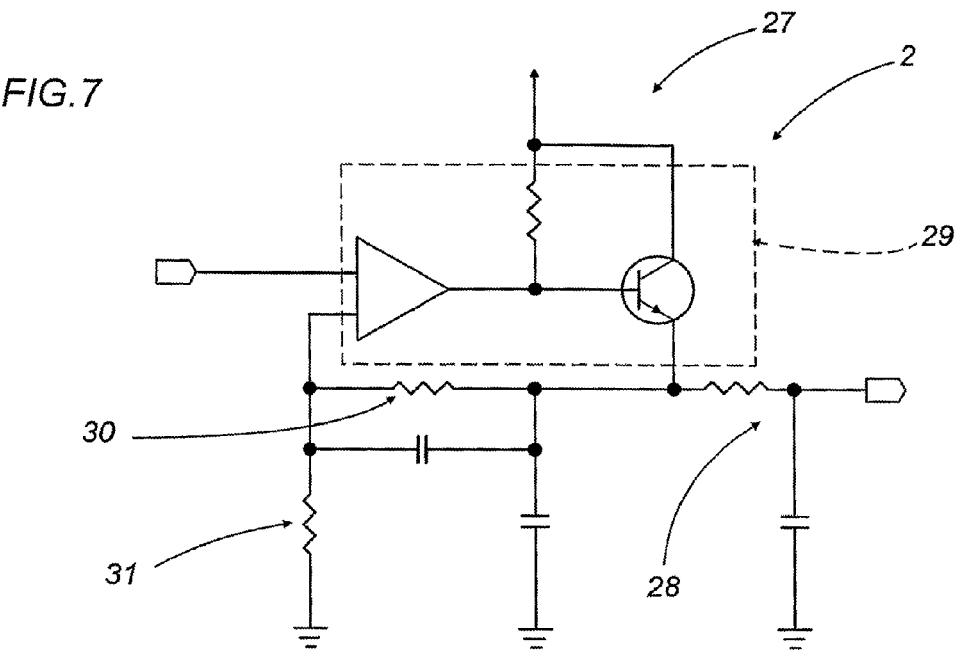
FIG. 7 shows a circuit diagram of a second detail of the drive of FIG. 1.

FIG. 7 shows a diagram of an embodiment of the shunt current enveloping detector 27.

The detector 27 comprises an RC filter 28 for filtering the shunt current envelope.

The detector 27 also comprises a circuit 29 for charging a capacitor in such a way that when the non-inverting signal is lower than the inverting signal, the capacitor can be discharged through the resistors 30 and 31.

The resistors 30 and 31 are suitably connected to enable the device to follow the shunt current peaks.

Figure 8:
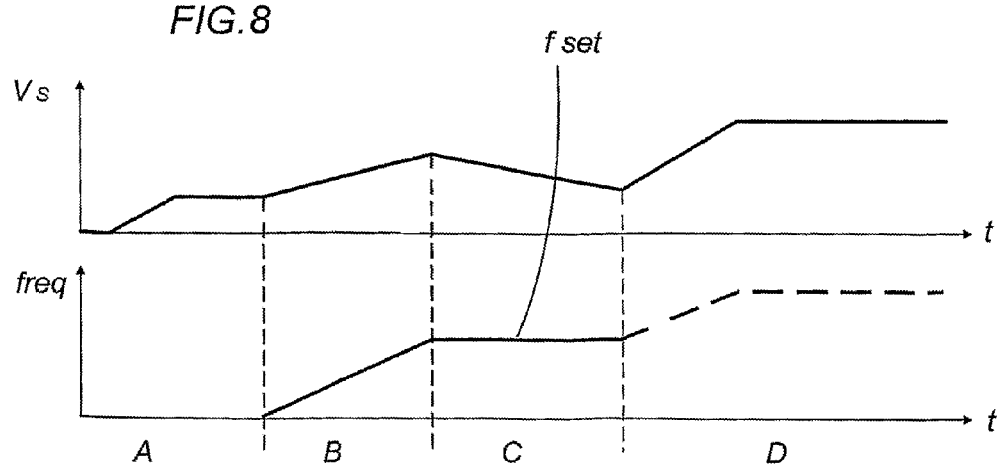
FIG. 8 illustrates a procedure for controlling the drive of FIG. 1 until optimum operating conditions are reached.

FIG. 8 illustrates the procedure for controlling the brushless motor 2, comprising the following steps:

A) step parking or alignment;
B) step of accelerating according to a predetermined ramp V/f;
C) step of "engaging" the c.e.m.f. zero crossing signal, where "engaging" means reaching an optimum operating condition;
D) step of optimized drive.

In steps A and B the inverter 3 powers the motor 2 entirely in "open loop" mode, that is to say, without using either of the two available feedback signals, namely, c.e.m.f. zero crossing and shunt current envelope.

In step C only the c.e.m.f. zero crossing signal is used.

Lastly, in step D both the c.e.m.f. zero crossing signal and the shunt current envelope signals are used and the inverter 3 drives the motor 2 under optimum operating conditions, that is to say, with the c.e.m.f. and the phase current in phase with each other.

During step A three constant voltages are applied to the motor, suitably defined to enable the current to flow in such a way as to make the rotor turn until it is at a known position where the stator field and the rotor field are aligned.

This step ensures that the maximum drive torque possible under "open loop" control conditions can be generated in the next step B.

In step B the motor 2 is powered by three sinusoidal voltages phase shifted by 120° from each other so as to create a rotary stator field at increasing frequency and whose amplitude is proportional to the frequency itself.

During this step, the amplitude of the mean voltage applied to the motor 2 varies proportionally with its frequency "freq", as illustrated in FIG. 8.

The frequency "freq" starts at zero and is increased until it reaches the "fset" value shown FIG. 8, set in the software of the microcontroller 26.

The "fset" value is greater than the minimum electrical frequency at which the c.e.m.f. zero crossing signal can be surely detected, so that the phase relation between the counter electromotive force $E_S$ and the applied voltage $V_S$ can be measured in the next steps C and D.

This relation is the angle δ made by the quantities $E_S$ and $V_S$ shown in FIGS. 3 and 4.

The slope of this acceleration ramp is a parameter of the drive and must be modified according to the inertia of the motor 2+load system.

The brushless motor 2 subjected to the rotary stator field generated by the drive accelerates until it exactly reaches the synchronous speed related to "fset".

In step B the brushless motor 2 is controlled in exactly the same way as an asynchronous motor but, unlike the latter, it reaches the end of ramp speed since, during the ramp itself, the angle between rotor field and stator field never exceeds 90 degrees representing the condition necessary and sufficient to generate the drive torque for the permanent magnet brushless motor which, as is known, is a "synchronous" motor.

The slope value of the ramp V/f is chosen in such a way as to guarantee that the motor receives sufficient current, and hence torque, to accelerate it in the required time to the speed corresponding to the frequency "fset", for example as a function of environmental parameters such as inverter 3 supply voltage and ambient temperature.

Reaching the frequency "fset" triggers step C, during which the frequency remains constant at the value "fset" and the applied voltage $V_S$ is decreased at a predetermined rate.

As mentioned, in step C the c.e.m.f. zero crossing signal is available and the phase between $V_S$ and $E_S$ is therefore measured through the microcontroller 26.

The gradual decrease of $V_S$ reduces the current draw $I_S$ until it reaches the minimum value required to keep the motor turning: when this condition is reached, $V_S$ and $E_S$ are substantially in phase, the microcontroller 26 detects the in phase condition between $V_S$ and $E_S$ and considers step C ended.

Step C is followed by step D.

In step D, only the amplitude Vs is set and not the frequency "freq".

The microcontroller 26 continuously detects the electrical frequency, acquiring the time interval between two consecutive signal edges, whether homologous or non-homologous, of the output signal from the c.e.m.f. zero crossing detection circuit 6 to which the frequency of the output voltage fundamental of the inverter 3 corresponds.

In order to obtain optimum operation of the motor 2, an iterative procedure comprising the steps described below is also implemented.

The peak value of the phase current is measured by the microcontroller 26 through the shunt current enveloping detector 27.

The microcontroller 26 detects the c.e.m.f. zero crossing through the respective detection circuit 6.

The microcontroller 26 then applies the advance $\delta_{opt}$ between $V_S$ and $E_S$, since the software installed in the microcontroller 26 incorporates the relation between the advance angle made by $V_S$ and $E_S$ and the peak value of the phase current corresponding to optimum operation.

At this point, the procedure restarts from the measurement of the peak value of the phase current.

The above mentioned optimizing procedure causes the brushless motor 2 to operate with the c.e.m.f. in phase with the respective phase current.

In this situation, as mentioned, absorbed power is minimized; by suitably setting the time interval of the optimizing procedure, it is possible to make the system reasonably reactive even to sudden load variations due, for example, to temporary choking of the delivery and/or suction ducts of the air-hydraulic circuit and the subsequent removal of the choking itself.

The control method described also allows maximum efficiency of motor drive by causing the current in each stator winding to be in phase with the respective c.e.m.f.

Thus, the motor generates the maximum torque possible. Expressed in other terms, the brushless motor is driven efficiently because the stator current has no components in the axis d but only in the axis q.

The drive operates in such a way that, once the starting transient is over, motor power consumption is minimized under all load conditions and at all speeds of rotation: in terms of the vector diagram, the phase current is in phase with the respective c.e.m.f.

The invention claimed is:

1. An electric drive comprising:
    a brushless motor having windings and a rotor;
    a power supply bridge for powering the motor, each phase winding of the motor having a resistance ($R_S$) and a synchronous inductance ($L_S$) a first circuit for detecting zero crossings of a counter electromotive force ($E_S$) induced in the windings by rotation of the rotor;
    a second circuit having a detector stage for detecting a phase current ($I_S$) flowing in the windings; and
    a third circuit for controlling the power supply bridge;
    the first circuit comprising an inductive and resistive element which is an analog representation of the phase winding electrical impedance, said inductive and resistive element being connected in series with a phase winding of the motor, the inductive and resistive element having an attenuated resistance and inductance, according to an attenuation coefficient "α", as compared to the resistance and inductance of one of the phase windings of the motor, the first circuit also comprising a circuit having three wye connected first, second and third resistors respectively valued $$"R_a = R\frac{\alpha}{3-2\alpha}",$$

"R", "R", for measuring a motor supply voltage applied to said phase winding, an output of the first circuit being an attenuated c.e.m.f. signal:

$$\alpha \cdot E_S = \alpha \cdot V_S - \alpha \cdot R_S \alpha I_S - \alpha \cdot L_S \cdot dI_S/dt;$$

where $0 \leq \alpha \leq 1$;
the third circuit comprising a controller in communication with the first circuit and the second circuit, with the first circuit providing the zero crossings of the counter electromotive force and with the second circuit providing the phase current flowing in the windings, said third circuit utilizing the communications from the first circuit and second circuit for applying an advance angle ($\delta_{opt}$) between the motor supply voltage ($V_S$) and the induced counter electromotive force ($E_S$), said advance angle ($\delta_{opt}$) being a predetermined linear function of a peak value of the phase current ($I_S$) according to an equation:

$$\delta = \frac{\pi \cdot L_S \cdot p}{60 \cdot K_E} \cdot I_S$$

where "$L_S$" is the synchronous inductance of the motor measured in Henrys, "p" is a number of poles of the motor and "$K_E$" is a counter electromotive force constant measured in V/rpm.

2. The drive according to claim 1, the controller controlling the power supply bridge according to the zero crossings of the electromotive force and according to an output voltage from the second circuit.

3. The drive according to claim 2, comprising, stored in the controller, a curve of the advance angle ($\delta_{opt}$) as a function of the phase current ($I_S$); said curve being obtained in the controller by using the advance angle ($\delta_{opt}$) to approximate a tangent of the advance angle (tg$\delta_{opt}$).

4. The drive according to claim 1, wherein the first circuit for detecting the zero crossings of the counter electromotive force ($E_S$) comprises a first stage comprising a first comparator.

5. The drive according to claim 4, wherein the first circuit for detecting the zero crossings of the counter electromotive force ($E_S$) comprises a second stage connected in cascade with the first stage to minimize spurious switching.

6. The drive according to claim 5, wherein the second stage comprises a hysteresis comparator.

7. The drive according to claim 1, wherein the second circuit comprises a shunt resistor at an output of the power supply bridge from which an envelope of the phase currents ($I_S$) is detected; the second circuit comprising an enveloping detector of the current flow on the shunt resistor.

8. The drive according to claim 1, wherein, the inductive and resistive element comprises a first and a second inductor, mutually coupled and having mutual inductance "M", said attenuation coefficient "$\alpha$" being defined as a ratio of a resistance "$R_{i1}$" of the first inductor to the phase resistance "$R_S$" of the motor and as a ratio of a total inductive value "$L_{i1}+M$" to the synchronous inductance "$L_S$" of the motor, that is:

$$\alpha = \frac{R_{i1}}{R_S} = \frac{L_{i1}+M}{L_s},$$

where $L_{i1}$ is an inductance of the first inductor.

9. The drive according to claim 8, wherein the first and second inductors are mutually connected to form an autotransformer, said first and second inductors being wound around a magnetic core.

10. The drive according to claim 9, wherein the second inductor has a number (N2) of turns much higher than a number (N1) of turns of the first inductor.

11. The drive according to claim 10, wherein the number (N2) of turns of the second inductor is a product of the number (N1) of turns of the first inductor by a difference between a ratio of the synchronous inductance ($L_S$) of the motor multiplied by the attenuation coefficient ($\alpha$) and the inductance ($L_{i1}$) of the first inductor and one, that is:

$$N2 = N1 \cdot \left(\frac{\alpha \cdot L_S}{L_{i1}} - 1\right).$$

12. The drive according to claim 8, wherein a number (N2) of turns of the second inductor is a product of a number (N1) of turns of the first inductor by a difference between a ratio of the synchronous inductance ($L_S$) of the motor multiplied by the attenuation coefficient ($\alpha$) and the inductance ($L_{i1}$) of the first inductor and one, that is:

$$N2 = N1 \cdot \left(\frac{\alpha \cdot L_S}{L_{i1}} - 1\right).$$

13. The drive according to claim 8, wherein the second inductor has a number (N2) of turns much higher than a number (N1) of turns of the first inductor.

14. The drive according to claim 13, wherein the number (N2) of turns of the second inductor is a product of the number (N1) of turns of the first inductor by a difference between a ratio of the synchronous inductance ($L_S$) of the motor multiplied by the attenuation coefficient ($\alpha$) and the inductance ($L_{i1}$) of the first inductor and one, that is:

$$N2 = N1 \cdot \left(\frac{\alpha + L_S}{L_{i1}} - 1\right).$$

* * * * *

UNITED STATES PATENT AND TRADEMARK OFFICE
CERTIFICATE OF CORRECTION

PATENT NO. : 8,476,855 B2  Page 1 of 1
APPLICATION NO. : 12/677716
DATED : July 2, 2013
INVENTOR(S) : Pietro De Filippis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this
Eighth Day of September, 2015

Michelle K. Lee
*Director of the United States Patent and Trademark Office*